United States Patent
Gudur et al.

(10) Patent No.: US 10,304,129 B2
(45) Date of Patent: May 28, 2019

(54) KNOWN NEAREST NEIGHBOR (KNN)

(71) Applicant: American Express Travel Related Services Company, Inc., New York, NY (US)

(72) Inventors: Madhu Sudhan Reddy Gudur, Phoenix, AZ (US); Vinod Yadav, Phoenix, AZ (US); Satish T. Narayanan, Phoenix, AZ (US); Harish R. Naik, Phoenix, AZ (US); Anand Bhushan, New York, NY (US); Amber G. Gupta, New York, NY (US); Sanjay S. Gwalani, New York, NY (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 0 days.

(21) Appl. No.: 15/988,679

(22) Filed: May 24, 2018

(65) Prior Publication Data
US 2018/0276746 A1   Sep. 27, 2018

Related U.S. Application Data

(62) Division of application No. 15/018,393, filed on Feb. 8, 2016.

(51) Int. Cl.
 G06F 7/00 (2006.01)
 G06F 17/30 (2006.01)
 G06Q 40/02 (2012.01)
 G06F 13/40 (2006.01)

(52) U.S. Cl.
 CPC ....... *G06Q 40/025* (2013.01); *G06F 13/4068* (2013.01)

(58) Field of Classification Search
 None
 See application file for complete search history.

(56) References Cited

U.S. PATENT DOCUMENTS

| | | |
|---|---|---|
| 2003/0120571 A1 | 6/2003 | Blagg |
| 2003/0212620 A1 | 11/2003 | Blagg |
| 2007/0083444 A1 | 4/2007 | Matthews |
| 2015/0058214 A1 | 2/2015 | Cohen |
| 2015/0220958 A1* | 8/2015 | Tietzen ............ G06Q 30/0226 705/14.15 |
| 2016/0005061 A1* | 1/2016 | Chavarria .......... G06Q 30/0205 705/7.34 |
| 2016/0034925 A1 | 2/2016 | Unser |

OTHER PUBLICATIONS

USPTO; Restriction Requirement Office Action dated Apr. 19, 2018 in U.S. Appl. No. 15/018,393.
USPTO; Non-Final Office Action dated Aug. 8, 2018 in U.S. Appl. No. 15/018,393.

* cited by examiner

*Primary Examiner* — Tuan A Pham
(74) *Attorney, Agent, or Firm* — Snell & Wilmer, L.L.P.

(57) ABSTRACT

Systems and methods of improving the operation of a transaction network and transaction network devices is disclosed. A lightning KNN host may comprise various modules and engines as discussed herein wherein lookalike records may be identified whereby the speed of the lightning KNN network may be enhanced and the accuracy and precision of results improved whereby the transaction network more properly functions according to approved parameters.

14 Claims, 10 Drawing Sheets

KNOWN NEAREST NEIGHBOR (KNN)

CROSS REFERENCE TO RELATED APPLICATIONS

This application is a divisional of, claims priority to and the benefit of, U.S. Ser. No. 15/018,393 filed Feb. 8, 2016 and entitled "SYSTEM AND METHOD FOR DATA ANALYTICS," which is incorporated herein in its entirety for all purposes.

FIELD

The present disclosure relates to data analytics for transaction data.

BACKGROUND

Large data sets may exist in various sizes and levels of organization. With big data comprising data sets as large as ever, the volume of data collected incident to the increased popularity of online and electronic transactions continues to grow. Billions of rows and hundreds of thousands of columns worth of data may populate a single table, for example. An example of the use of big data is in identifying and categorizing business spending and consumer spending, which is frequently a key priority for transaction card issuers. However, transactions processed by the transaction card issuer are massive in volume and comprise tremendously large data sets. Companies frequently desire to process and analyze this data; however, such processing and analysis is typically time consuming and resource intensive due to the volume of data. These limitations confuse and frustrate the identification and categorization of transaction data, while also hampering data analytics.

SUMMARY

In accordance with various embodiments, a lightning KNN (known nearest neighbor) host may include a historical data retrieval engine configured to load historically processed data, a distance evaluator configured to evaluate a distance between a cluster value of each set and a corresponding value of a field of a record of a new cardholder, whereby a plurality of new-cardholder-to-cluster-value distances are determined, and an outer radius boundary determiner is configured to determine an outer radius boundary of each set. The lightning KNN host may include a first ceiling number radius receiver configured to receive a first ceiling number radius, a set discarder configured to retain each set with a new-cardholder-to-cluster-value distance locating a portion of the set within the first ceiling number radius, and a communication bus disposed in logical communication with the historical data retrieval engine, the distance evaluator, the outer radius boundary determiner, and the first ceiling number radius receiver, and.or the set discarder. The lightning KNN host may include a bus controller disposed in logical communication with the communication bus and configured to direct communication among the historical data retrieval engine, the distance evaluator, the outer radius boundary determiner, the first ceiling number radius receiver, and/or the set discarder. The record may be mapped according to a lightning KNN method.

The lightning KNN host may include a field value determiner configured to determine a value of the field of the record of a plurality of records, a record grouper configured to group the plurality of records into sets, and a historical data storage engine configured to store each set and an associated cluster proximity and an associated cluster value in a historically processed data set.

In various embodiments, each record of the plurality of records represents a cardholder. In various embodiments, the cluster value includes a center value of the set. In various embodiments, the field of the record of the new cardholder includes a credit limit. In various embodiments, the new-cardholder-to-cluster-value distance includes the distance between the cluster value and a value of the field of the record of the new cardholder. In various embodiments, the outer radius boundary of the set includes a sum of a cluster proximity and the new-cardholder-to-cluster-value distance.

A lightning KNN method may include loading the historically processed data from a node of a distributed storage system, evaluating a distance between a cluster value of each set and a corresponding value of a field of a record including a new cardholder, whereby a plurality of new-cardholder-to-cluster-value distances are determined, and adding a cluster proximity of each set to a new-cardholder-to-cluster-value distance of the set to form an outer radius boundary of the set including a distance from the new cardholder to a farthest most boundary of each set. The method may include receiving a first ceiling number radius including a distance from between the new cardholder encircling a first ceiling number of records, and discarding each set with the new-cardholder-to-cluster-value distance not locating a portion of the set within the first ceiling number radius.

In various embodiments, the method may include determining a value of the field of the record for all records representing a cardholder, grouping the records into sets located within the cluster proximity of the cluster value, wherein the cluster value includes a center point of the set and the cluster proximity includes a radius about the cluster value, and storing the set and associated cluster proximity and the cluster value in a historically processed data database.

In various embodiments, each record represents a cardholder. In various embodiments, the cluster value includes a center value of the set. In various embodiments, the field of the record of the new cardholder includes a credit limit. In various embodiments, the new-cardholder-to-cluster-value distance includes the distance between the cluster value and a value of the field of the record of the new cardholder. In various embodiments, the outer radius boundary of the set includes a sum of the cluster proximity and the new-cardholder-to-cluster-value distance.

A lightning KNN network may include a lightning KNN host configured to map a cardholder according to a lightning KNN method, wherein the lightning KNN host directs data to be stored, a distributed storage system including a plurality of nodes, and the distributed storage system configured to direct data to the lightning KNN host, in response to the lightning KNN method of the lightning KNN host. The network may include a telecommunications transfer channel including a network logically connecting the lightning KNN host to the distributed storage system.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Figure 1A:
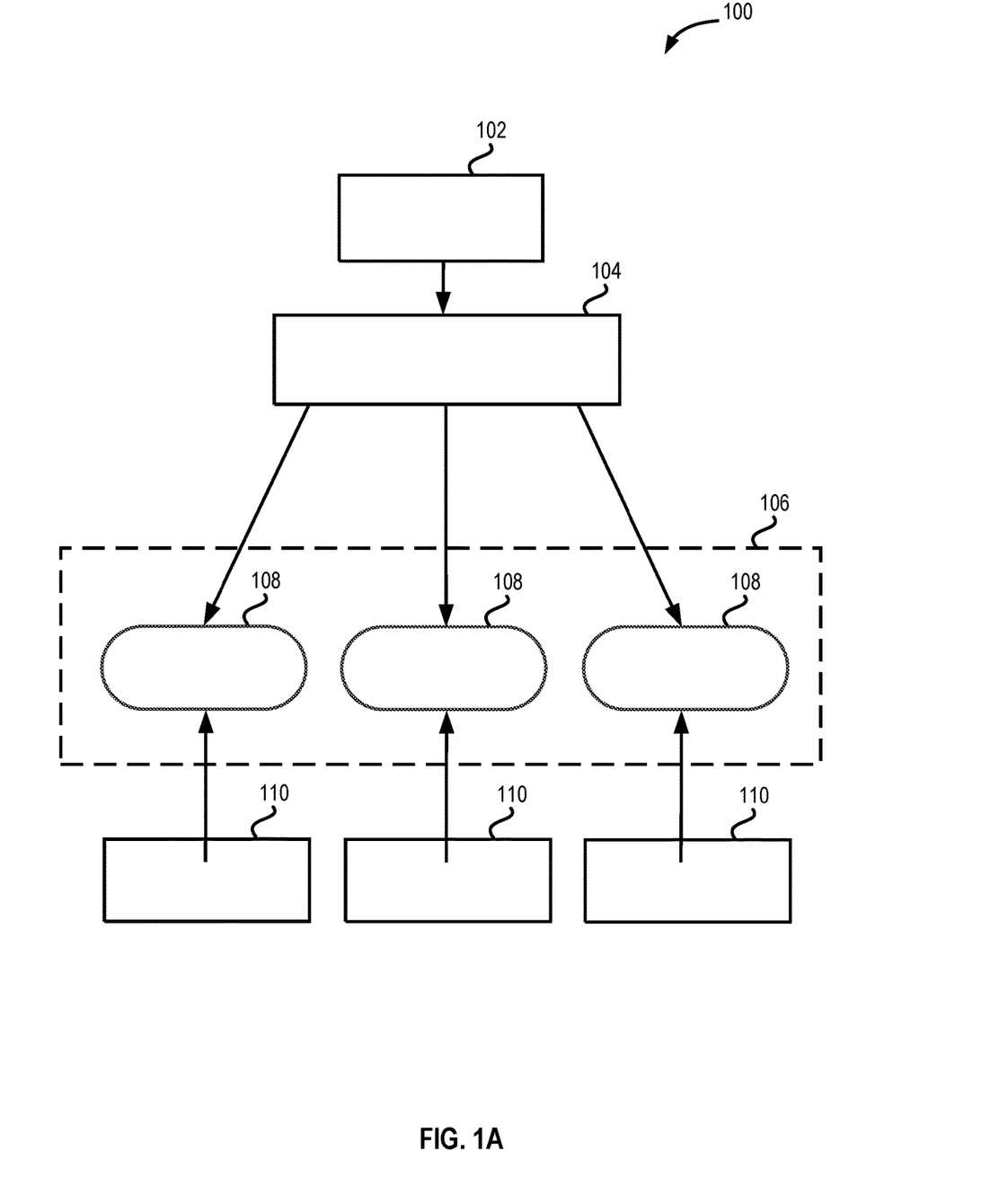
FIG. 1A illustrates an exemplary system for distributed storage and distributed processing, in accordance with various embodiments.

With reference to FIG. 1A, system 100 for distributed data storage and processing is shown, in accordance with various embodiments. System 100 may comprise a lightning KNN host 102. Lightning KNN host 102 may comprise any device capable of receiving and/or processing an electronic message via telecommunications transfer channel 104. Telecommunications transfer channel 104 may comprise a network. Lightning KNN host 102 may take the form of a computer or processor, or a set of computers/processors, although other types of computing units or systems may be used, including laptops, notebooks, hand held computers, personal digital assistants, cellular phones, smart phones (e.g., iPhone®, BlackBerry®, Android®, etc.) tablets, wearables (e.g., smart watches and smart glasses), or any other device capable of receiving data over telecommunications transfer channel 104.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptography systems.

In various embodiments, lightning KNN host 102 may interact with distributed storage system 106 for storage and/or processing of big data sets. As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, transaction network internal data, third party data, credit reporting bureau data, or from other suitable sources. Big data sets may be compiled without descriptive metadata such as column types, counts, percentiles, or other interpretive-aid data points.

In various embodiments, distributed storage system 106 may comprise one or more nodes 108. Nodes 108 may comprise computers or processors the same as or similar to lightning KNN host 102. Nodes 108 may be distributed geographically in different locations, housed in the same building, and/or housed in the same rack. Nodes 108 may also be configured to function in concert to provide storage space and/or processing power greater than one of a node 108 might provide alone. As a result, distributed storage system 106 may collect and/or store the data 110. Data 110 may be collected by nodes 108 individually and compiled or in concert and collated. Data 110 may further be compiled into a data set and formatted for use in lightning KNN method 200 of FIG. 3.

In various embodiments, data 110 may comprise a collection of data including and/or originating from cardholder information, transaction information, account information, record of sales, account history, customer history, sensor data, machine log data, data storage system, public web data, and/or social media. Data 110 may be collected from multiple sources and amalgamated into a big data structure such as a file, for example. In that regard, the data may be used as an input to generate metadata describing the big data structure itself, as well as the data stored in the structure.

The distributed storage system 106 may comprise a transaction network. A lightning KNN host 102 may comprise various modules and engines as discussed herein wherein data records within data 110 may be evaluated whereby the "nearest neighbor" record(s) may be identified. A nearest neighbor record comprises a record having a field with a value more like another specific record, than any other record. For instance, a first record, a second record and a third record may exist, each with a field, for instance, transaction size, having a value, for instance, a dollar amount. If the first record contains a transaction size comprising $100, the second record contains a transaction size comprising $200 and the third record contains a transaction size comprising $1000, the first record comprises a nearest neighbor record of the second record and the second record comprises a nearest neighbor record of the first record. Furthermore, the third record may be said to be a second nearest neighbor record of the second record, and a third nearest neighbor record of the first record, in other words, the nearest neighbor records may be ranked by proximity. As will be discussed further herein, a lightning KNN method 200 may determine all the nearest neighbor records of all records within data 110 and/or a subset of data 110.

A lightning KNN method may thus be implemented in real-time applications. For instance, nearest neighbor analysis may be performed in real time or near real time by virtue of the quick computational speeds enjoyed by the method. Moreover, a lightning KNN method may be implemented to perform model development for different segments of the markets by identifying the nearest neighbors. Lightning KNN will permit, by virtue of the quick computational speeds enjoyed, the data sets evaluated to be quite large, thereby improving the accuracy of developed models. For instance, while traditional KNN methods may take as long as 70 ms to determine an optimal credit line for a new cardholder, lightning KNN can in various embodiments determine an optimal credit line for a new cardholder in about 7 ms. In further embodiments, transaction data analysis on about ten billion transactions per year may in traditional KNN require 8 hours of processing time, whereas lightning KNN can in various embodiments process such data in about 30 ms. In further embodiments, the speed enhancement may be leveraged to improve accuracy and precision of results, such as allowing processing of more records per second. Lightning KNN will permit fraud detection, for instance, facilitating the analysis of each transaction of each customer of a transaction card provider and in real time, whereby fraudulent transactions may be more readily identified. As such, a lightning KNN method may be implemented for various objectives, for instance, by assessing records to determine nearest neighbors, a lightning KNN method may be implemented to determine the optimal line (e.g., the most profitable credit limit) for a new cardholder, such as by assessing the profitability of every other similarly situated cardholder in view of their credit limits and picking the credit limit most frequently associated with improved profitability.

In various embodiments, a lightning KNN method involves multiple complex and interactive machine steps. For instance, evaluating the data 110 at a transaction level provides sufficient granularity. Data may be evaluated at the transaction level and/or aggregated such as to facilitate further data processing.

For instance, with reference to FIGS. 2-4F, a global new account engine 10 may request that a global decisioning engine 20 determine an optimal line (e.g., the credit limit) that for a given new cardholder would result in the most profit for the card issuer. The global decisioning engine 20 may pass data 110 to a real-time processing module 30. The real-time processing module 30 may comprise all or part of a lightning KNN host 102 configured to perform a lightning KNN method 200, and/or may interact with a data warehouse module 40 to retrieve historically processed data 55 fully or partially processed according to a lightning KNN method 200, and may provide an optimal line recommendation 50 to the global decisioning engine 20. In various embodiments, the data warehouse module 40 may comprise a data warehouse associated with batch processing, which in various embodiments may be referred to as "Cornerstone."

Figure 3:
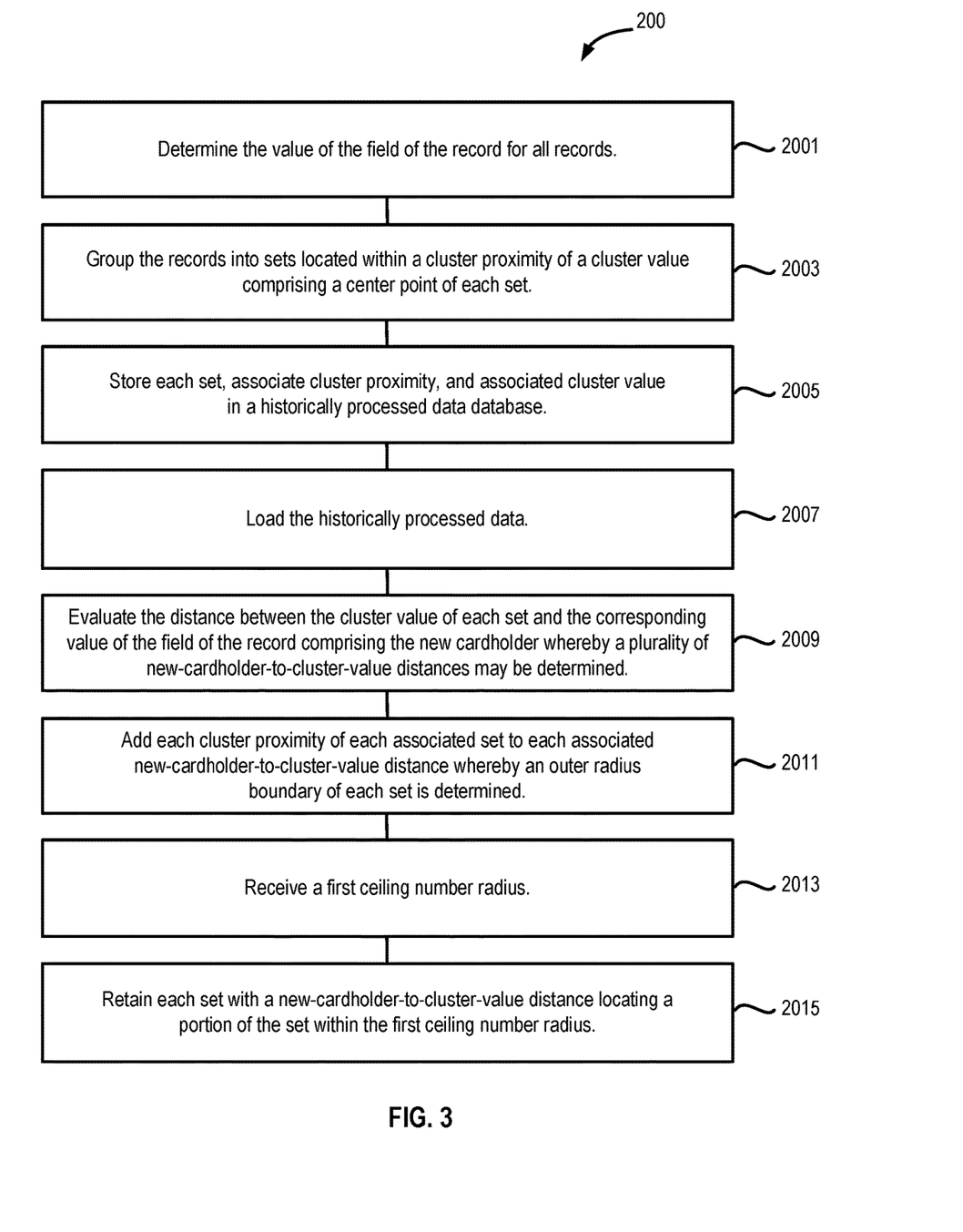
FIG. 3 illustrates an exemplary lightning KNN method, in accordance with various embodiments.
Figure 4A:
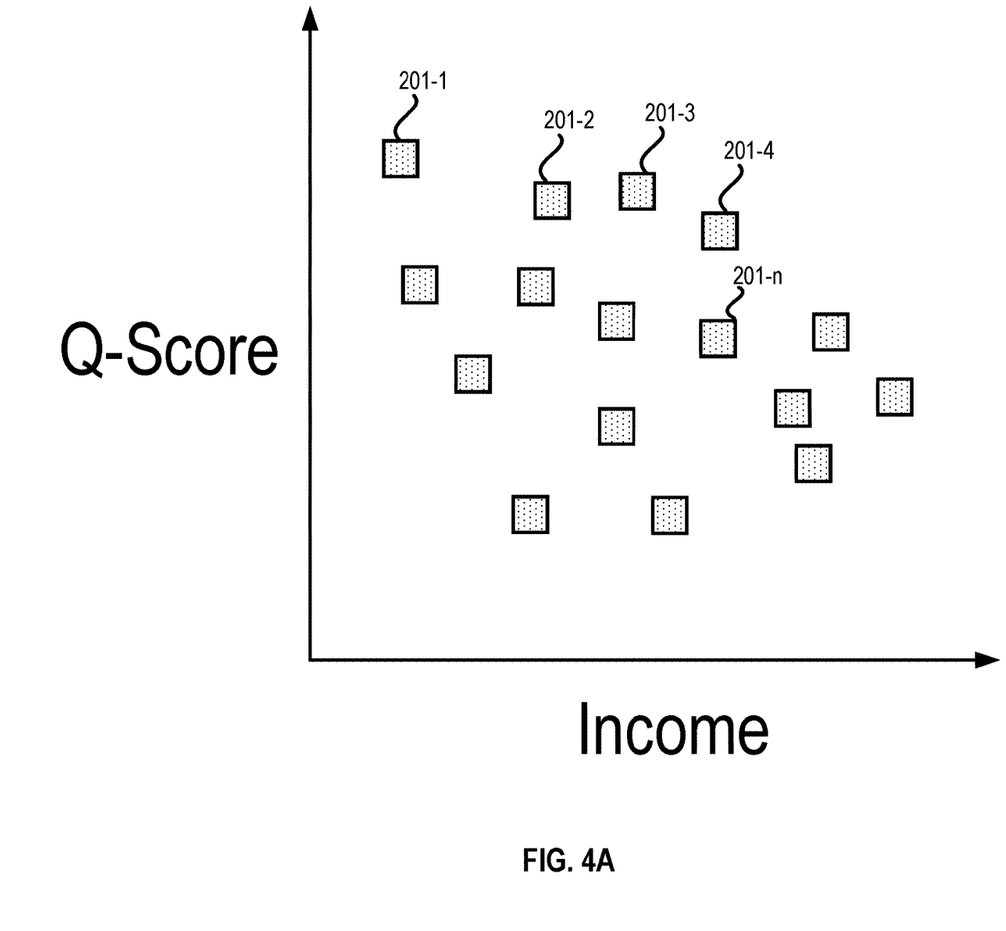
FIG. 4A-F illustrates various aspects of an exemplary lightning KNN method of FIG. 3, in accordance with various embodiments.
Figure 4B:
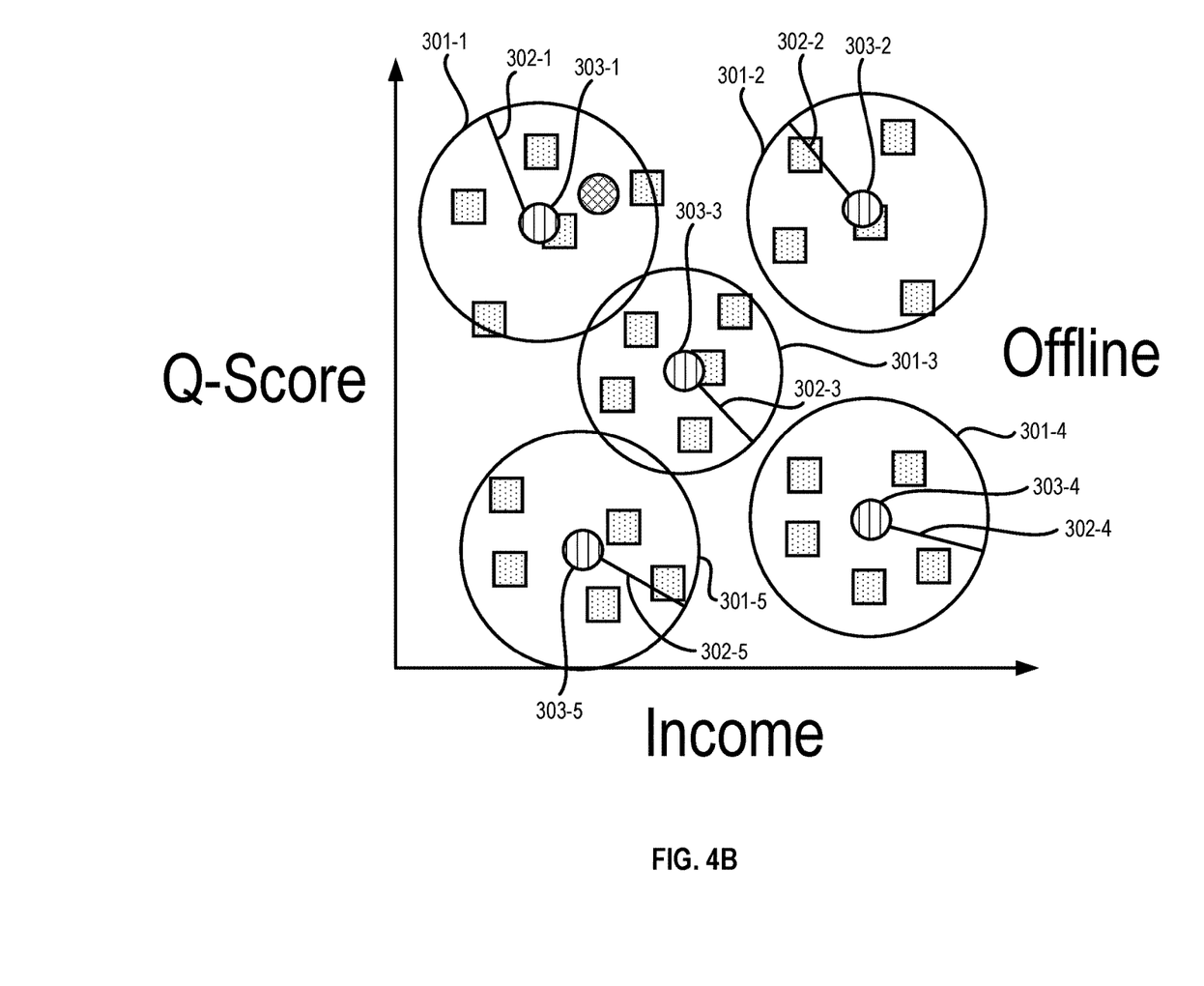
Figure 4C:
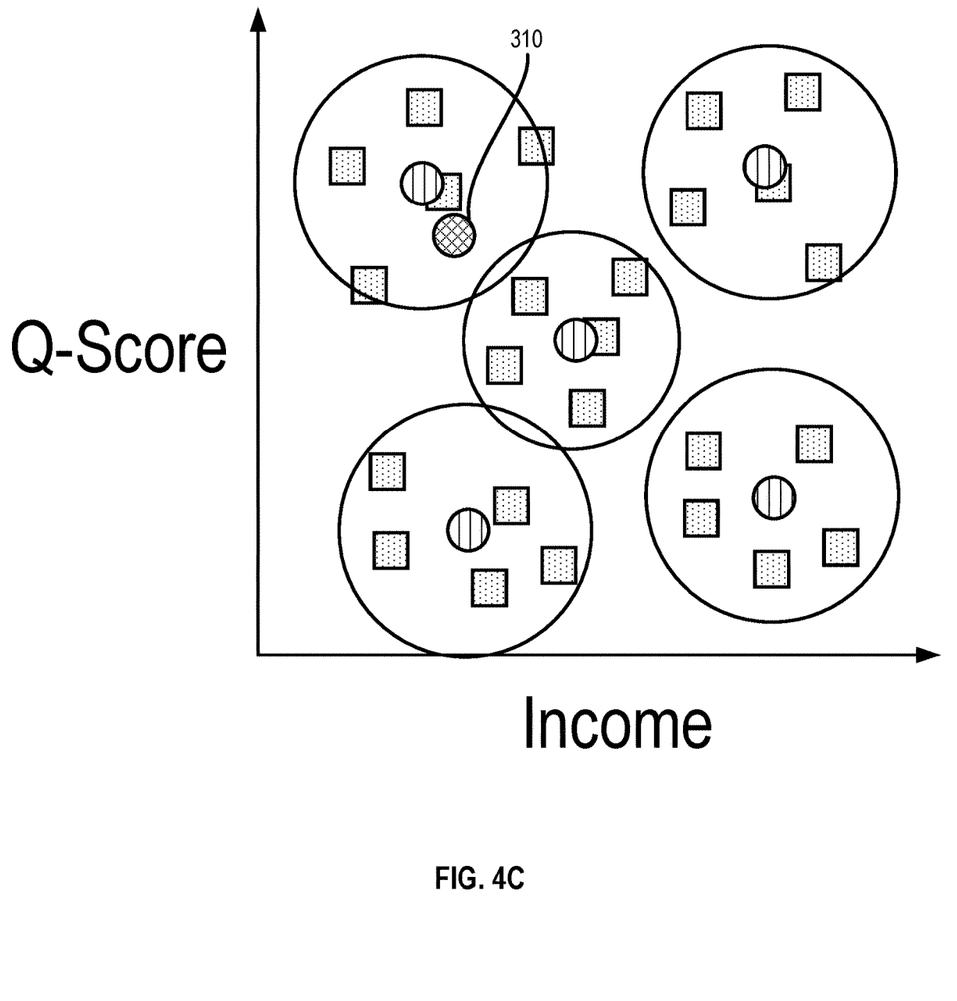
Figure 4D:
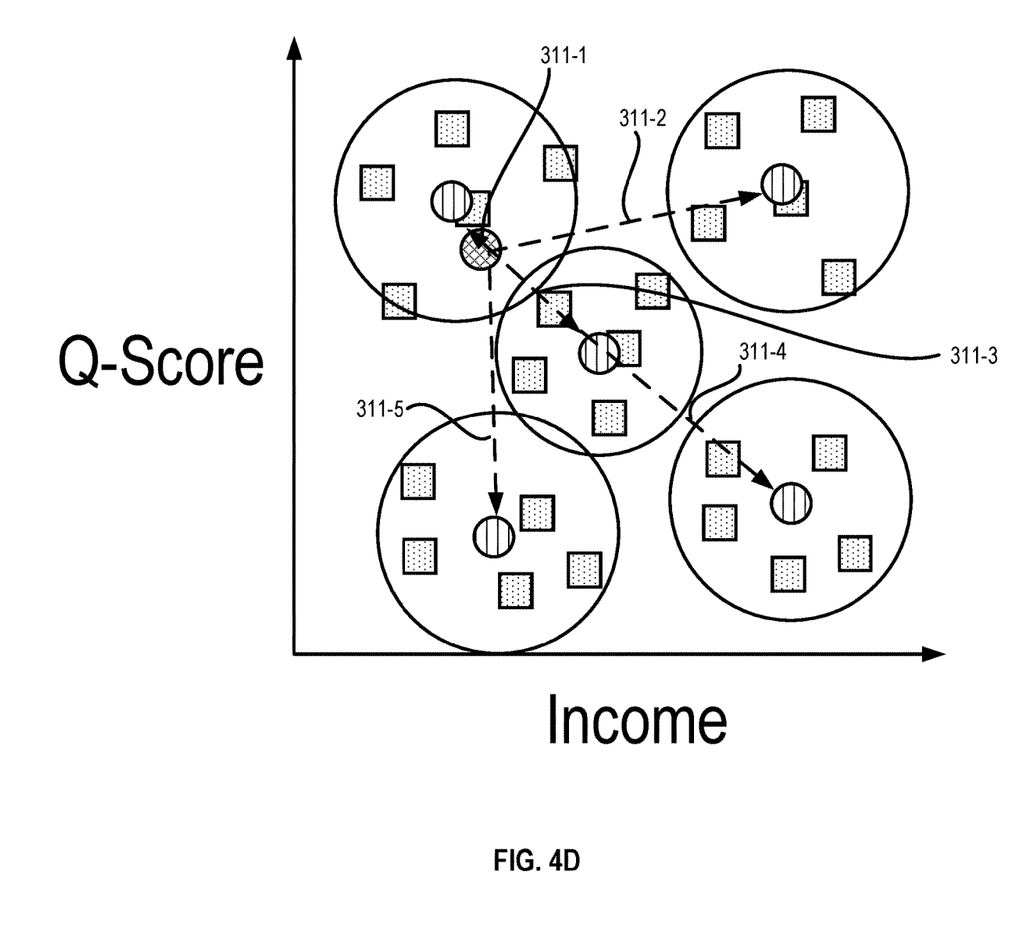
Figure 4E:
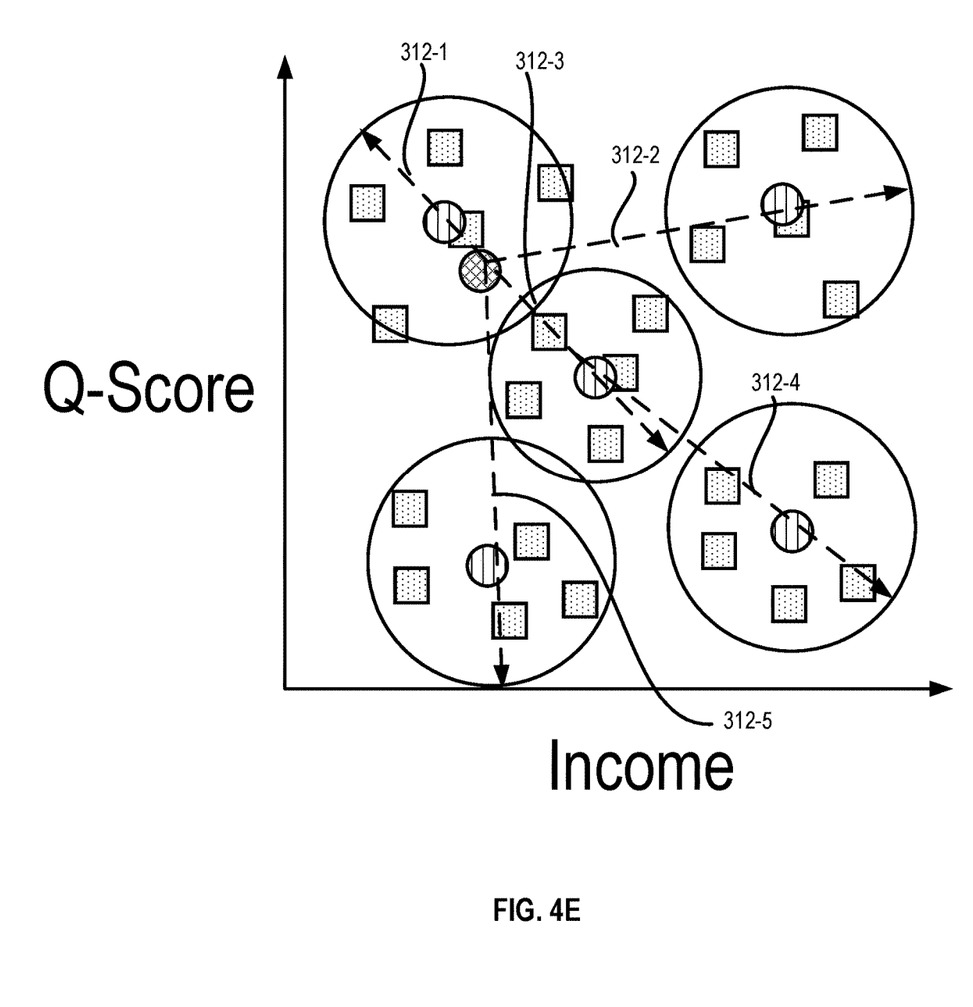
Figure 4F:
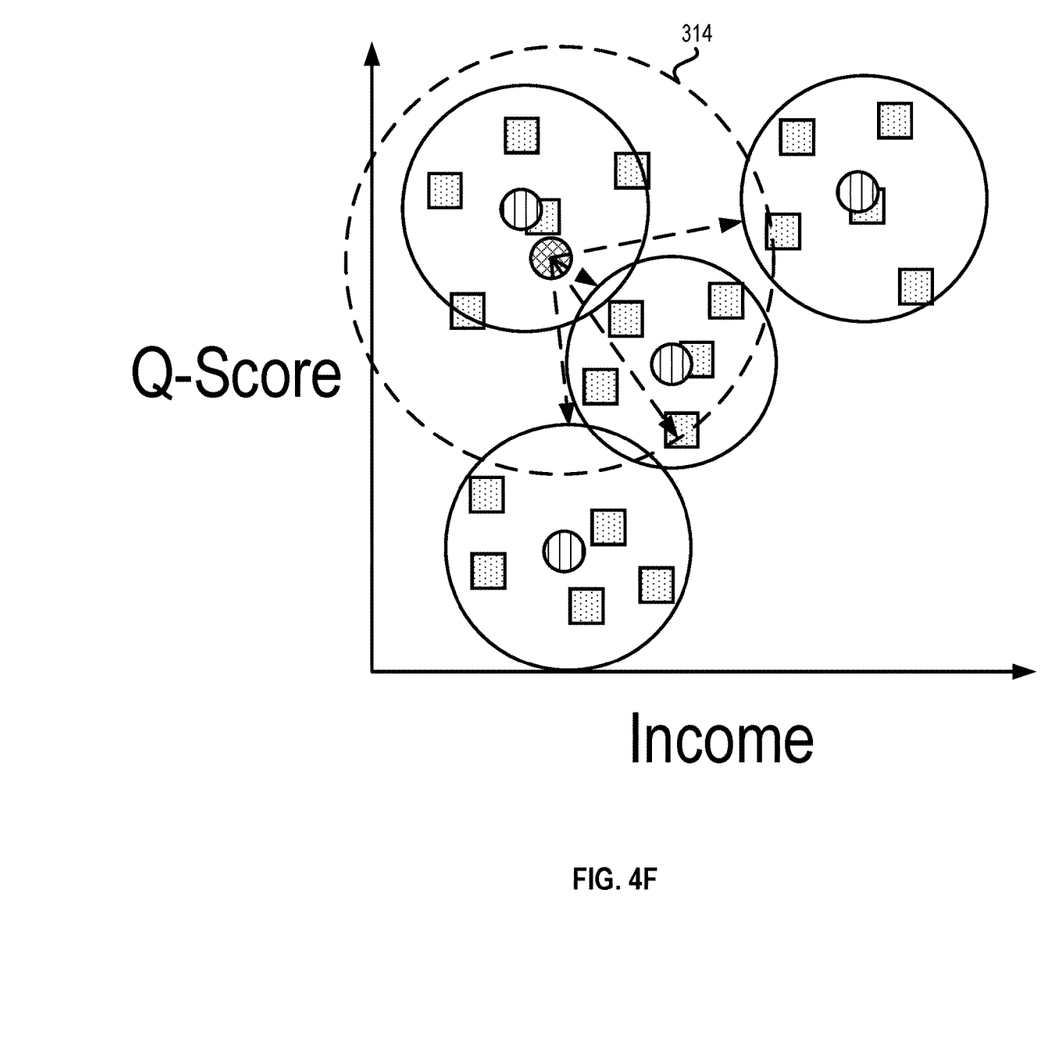

In various embodiments, the lightning KNN method 200 may identify the nearest neighbor records, as discussed, wherein each record represents a cardholder. Thus, "look alike" cardholders may be identified. The method may calculate the distance between the variables comprising the records for every cardholder. This data may be stored as historically processed data 55. Upon acquisition of a new cardholder, the method may identify the three nearest neighbors, the first nearest neighbor, the second nearest neighbor, and the third nearest neighbor, or any number of nearest neighbors by assessing the historically processed data 55.

In various embodiments, sets of cardholders all located within a given distance of one another (e.g., a "first cluster proximity") may be grouped into sets (e.g., "a first cluster"). The records of each cardholder may have fields and each field may have a value. The values of each cardholder within the first cluster may be ingested and a center value determined of the first cluster, for instance, an average of each value of each cardholder. The center value may comprise a "first cluster value," and a corresponding cluster record may be created comprising a cluster field having the first cluster value and be stored in the historically processed data 55.

In various embodiments, the lookalike cardholders of a new cardholder may be desired to be identified. Rather than determining a distance between the variables comprising the new cardholder and every other cardholder, instead, the value of a variable of the new cardholder may be compared to the first cluster value and the cardholder determined to be proximate to the first cluster value. In various embodiments, there may be multiple cluster values, for instance, a first cluster value, a second cluster value and a third cluster value, as there may be multiple clusters, such as a first cluster, a second cluster and a third cluster. The nearest neighbor cluster of the new cardholder may be determined. In various embodiments, the lookalike cardholders of the new cardholder may be desired to be identified, and/or a distance between the variables comprising the new cardholder and other cardholders may be desired to be identified. Because the nearest neighbor cluster of the new cardholder is determined, processing efficiency may be improved by only determining the look alike cardholders from within the nearest neighbor cluster of the new cardholder, or in various embodiments, form within the nearest neighbor cluster of the new cardholder, and only those other clusters whose cluster value is no farther from the new cardholder than the nearest neighbor cluster and/or only those clusters of which a portion lies within a radius extending from the new cardholder and outward only so far as to include a first ceiling number (FCN) of records as discussed further herein.

More specifically, a lightning KNN method 200 may include determining the value of the field of the record 201 for all records (first record 201-1, second record 201-2, third record 201-3, fourth record 201-4, Nth record 201-*n*) (FIG. 4A) (step 2001). Each of the records 201 each represent a cardholder. For instance, a first record 201-1 represents a first cardholder, a second record 201-2 represents a second cardholder, a third record 201-3 represents a third cardholder, a fourth record 201-4 represents a fourth cardholder, and a Nth record 201-n represents a Nth cardholder. The records may be grouped into sets 301 located within a distance (e.g., cluster proximity 302) of a cluster value 303 (step 2003). A cluster value 303 may comprise a center point of each set 301. For instance, with reference to FIG. 4B, a first set 301-1 may have a first cluster proximity 302-1 comprising a radius about a first cluster value 303-1. A second set 301-2 may have a second cluster proximity 302-2 comprising a radius about a second cluster value 303-2. A third set 301-3 may have a third cluster proximity 302-3 comprising a radius about a third cluster value 303-3. A fourth set 301-4 may have a fourth cluster proximity 302-4 comprising a radius about a fourth cluster value 303-4. A fifth set 301-5 may have a fifth cluster proximity 302-5 comprising a radius about a fifth cluster value 303-5. Any number of sets 301 may have a cluster proximity 302 comprising a radius about a cluster value 303.

Each set 301 and associated cluster proximity 302 and cluster value 303 may be stored in a historically processed data 55 database (FIG. 3) (step 2005). In this manner, offline processing may be leveraged to compute cluster values 303 also known as K-Means values for sets of records.

In various embodiments, it may be desired to evaluate no more than a first ceiling number of records. For instance, evaluation of more records may result in slower processing. As such, a first ceiling number (FCN) of records may be set.

Upon acquisition of a new cardholder 310, the historically processed data 55 may be loaded (step 2007). The lightning KNN method 200 may include evaluating the distance between the cluster value 303 of each set 301 and the corresponding value of the field of the record comprising the new cardholder 310 (step 2009). For instance, for a first through fifth set 301-1 through 301-5, a first through fifth new-cardholder-to-cluster-value distance 311-1 through 311-5 may be determined. As such, a plurality of new-cardholder-to-cluster value distances 311 may be determined.

For each of the first through fifth new-cardholder-to-cluster-value distances 311-1 through 311-5, the cluster proximity 302 of the associated set 301 may be added to the first through fifth new-cardholder-to-cluster-value distance 311-1 through 311-5 to form an outer radius boundary 312-1 through 312-5 of each set 301-1 through 301-5, meaning the distance from the new cardholder 310 to the farthest most boundary of each set 301 (step 2011).

In further embodiments, a first ceiling number radius 314 is received (step 2013). The first ceiling number radius 314 is the distance from between the new cardholder 310 to the FCN$^{th}$ record. In this manner, a radius may be determined that includes no more than a FCN of records. Within the first ceiling number radius 314, various new-cardholder-to-cluster-value distances 311 will exist, each associated with a set 301. Each set 301 with a new-cardholder-to-cluster-value distance locating a portion of the set 301 within the FCN radius 314 is retained, and all other sets 301 discarded. In this manner, it may be said that only those sets that fall within or touch the deterministic circle are retained (step 2015).

In this manner, the number of distances necessary to be calculated in order to determine lookalike cardholders may be diminished. Consequently the processing time may be improved.

Figure 1B:
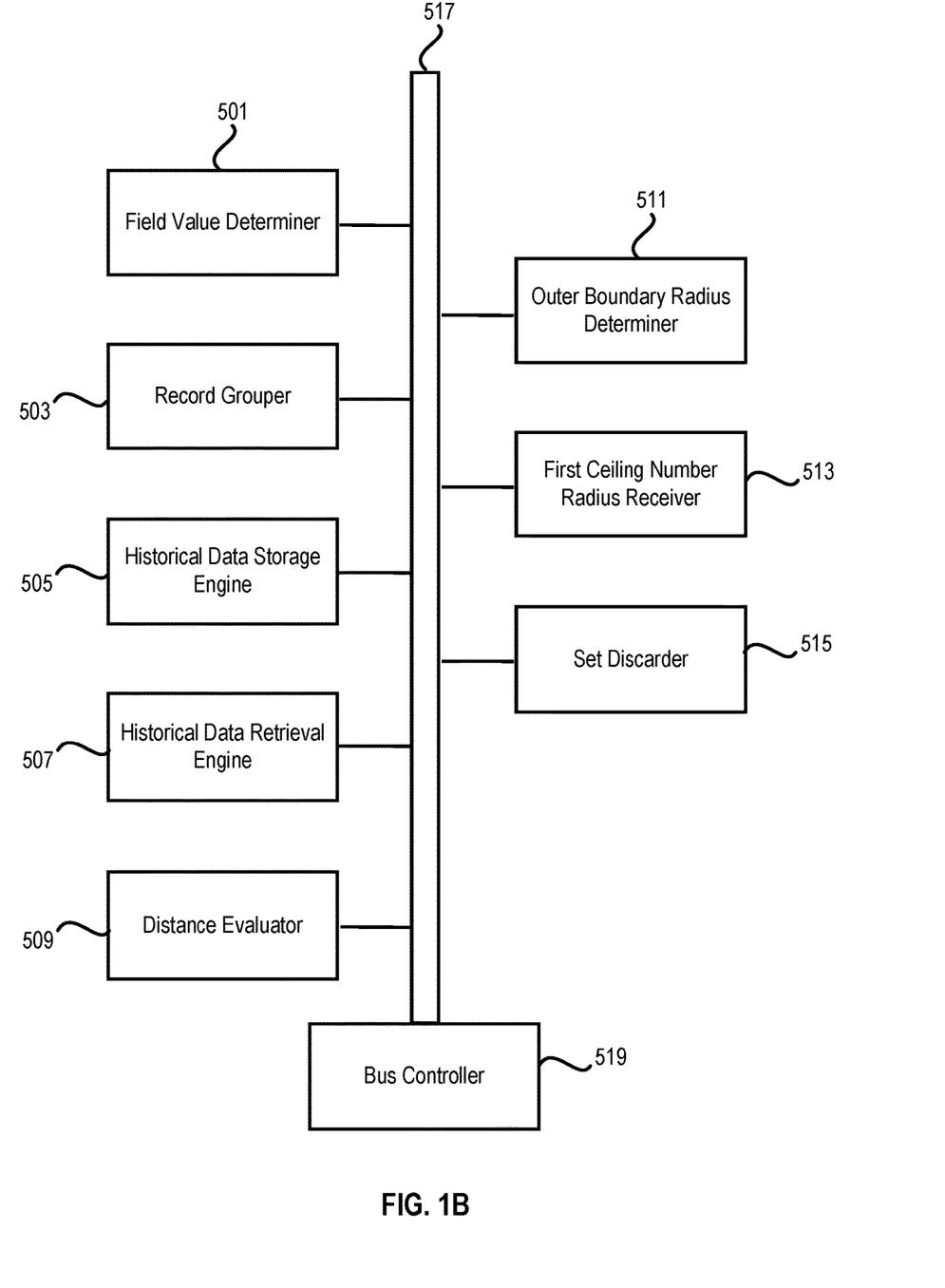
FIG. 1B illustrates an exemplary lightning KNN host component of a system according to FIG. 1A, in accordance with various embodiments.
Figure 2:
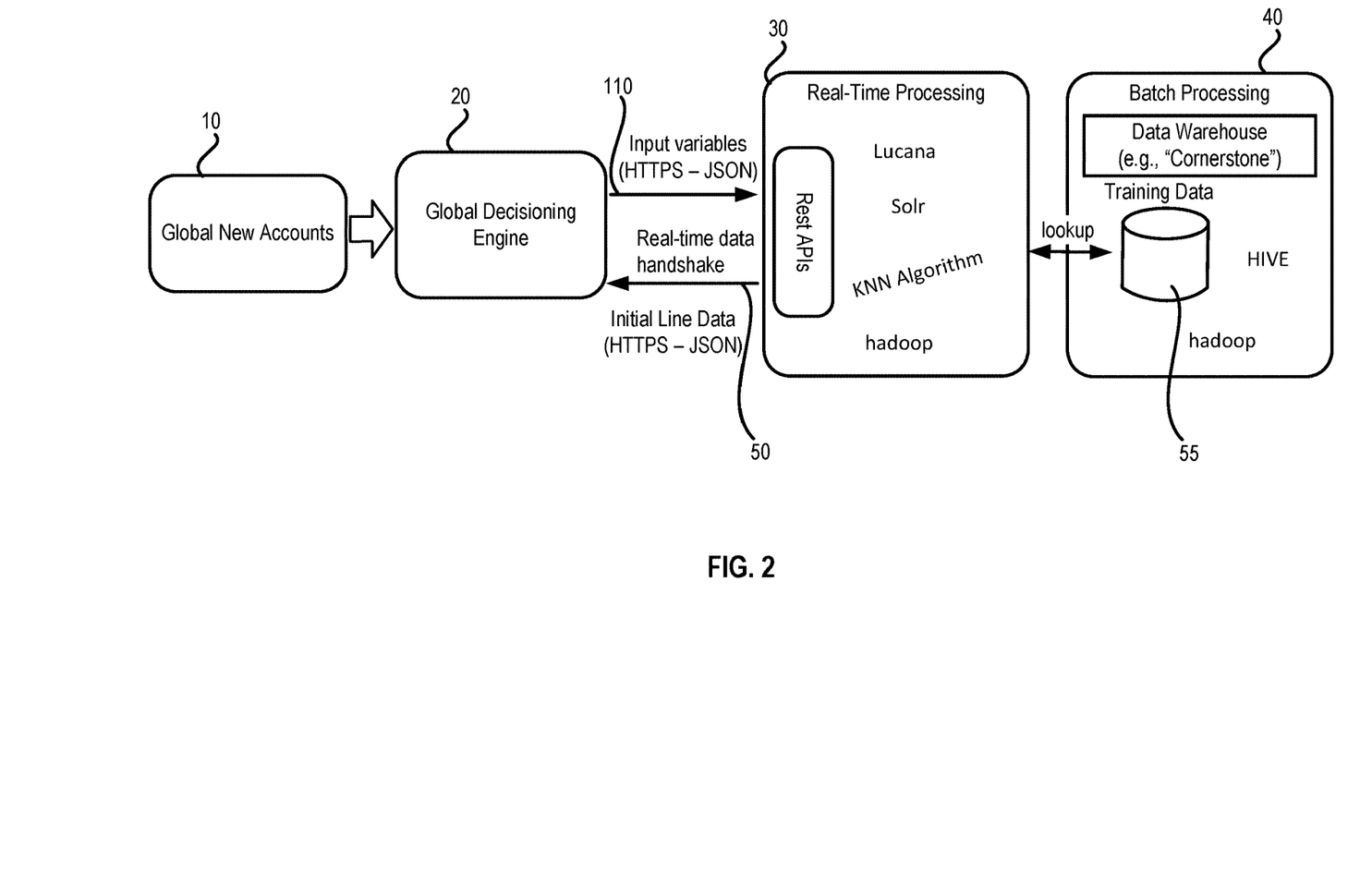
FIG. 2 illustrates an exemplary lightning KNN host component I/O scenario of a lightning KNN host component according to FIG. 1B, in accordance with various embodiments.

The lightning KNN method 200 may be performed by a lightning KNN host 102 as discussed. More specifically, various aspects of the lightning KNN host 102 may perform various aspects of the lightning KNN method 200. In this manner, the lightning KNN host 102 may map a cardholder according to a lightning KNN method 200. For instance, a lightning KNN host 102 may comprise a field value determiner 501. The field value determiner may comprise a module configured to determine the value of the field of the record 201 as per step 2001. The lightning KNN host 102 may comprise a record grouper 503. The record grouper may comprise a module configured to group the records into sets as per step 2003. The lightning KNN host 102 may comprise a historical data storage engine 505. For instance, a historical data storage engine may be configured to store each set, associated cluster proximity, and associated cluster value in a historically processed data database as per step 2005. The lightning KNN host 102 may comprise a historical data retrieval engine 507. The historical data retrieval engine 507 may be configured to load the historically processed data per step 2007. The lightning KNN host 102 may comprise a distance evaluator 509. The distance evaluator may evaluate the distance between the cluster value of each set and the corresponding value of the field of the record comprising the new cardholder, whereby a plurality of new-cardholder-to-cluster-value distances may be determined such as in step 2009. Furthermore, the lightning KNN host 102 may comprise an outer radius boundary determiner 511. The outer radius boundary determiner 511 may determine the outer radius boundary of each set such as in step 511. Moreover, the lightning KNN host 102 may comprise a first ceiling number radius receiver 513 configured to receive a first ceiling number radius. Finally, the lightning KNN host 102 may comprise a set discarder 515 configured to retain each set with a new-cardholder-to-cluster-value distance locating a portion of the set within the first ceiling number radius such as in step 2015.

Each of these aspects of the lightning KNN host 102 may be in logical communication with a lightning KNN communication bus 517. As such, each such aspect may interoperate via lightning KNN communication bus 517 by transceiving messages and data, and may perform various calculations, decisions, and operations in accordance with the teachings herein. Moreover, lightning KNN host 102 may further comprise a bus controller 519 configured to manage communications among modules on the lightning KNN communication bus 517, and direct various modules to perform various operations and processes in accordance with methods disclosed herein, as well as direct communications with external components such as distributed storage system 106, nodes 108, and/or the like.

Data, as discussed herein, may include "internal data." Internal data may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YouTube®, AppleTV®, Pandora®, xBox®, Sony® Playstation®), a uniform resource locator ("URL"), a document (e.g., a Microsoft Word® document, a Microsoft Excel® document, an Adobe .pdf document, etc.), an "ebook," an "emagazine," an application or microapplication (as described herein), an SMS or other type of text message, an email, Facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include Facebook®, Foursquare®, Twitter®, My Space®, LinkedIn®, and the like. Examples of affiliate or partner websites include American Express®, Groupon®, LivingSocial®, and the like. Moreover, examples of mobile device communications include texting, email, and mobile applications for smartphones.

A "consumer profile," "customer data," or "consumer profile data" may comprise any information or data about a consumer that describes an attribute associated with the consumer (e.g., a preference, an interest, demographic information, personally identifying information, and the like).

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows NT®, Windows 95/98/2000®, Windows XP®, Windows Vista®, Windows 7®, OS2, UNIX®, Linux®, Solaris®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, and optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CS S), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A network comprising:
a host processor; and
a tangible, non-transitory memory configured to communicate with the host processor,
the tangible, non-transitory memory having instructions stored thereon that, in response to execution by the host processor, cause the host processor to perform operations comprising:
evaluating, by the host processor, a distance between a cluster value of each sets of account holders and a corresponding value of a field of a record comprising a new account holder;
determining, by the host processor and based on the evaluating, a new-accountholder-to-cluster-value distance;
adding, by the host processor, a cluster proximity of each of the sets of the account holders to the new-accountholder-to-cluster-value distance of the sets of the account holders to form an outer radius boundary of the sets of the account holders comprising a distance from the new account holder to a farthest most boundary of each of the sets of account holders, wherein the outer radius boundary of the sets of the account holders comprises a sum of the cluster proximity and the new-accountholder-to-cluster-value distance;
receiving, by the host processor, a first ceiling number radius comprising a distance from the new account holder encircling a first ceiling number of records; and
discarding, by the host processor, each of the sets of the account holders with the new-accountholder-to-cluster-value distance that is not located within a portion of the sets of the account holders within the first ceiling number radius.

2. The network of claim 1, wherein the host processor comprises:
a field value determiner configured to determine a value of the field of each record of a plurality of records;
a record grouper configured to group the plurality of records into sets; and
a historical data storage engine configured to store in a historically processed data set each of the sets of the account holders, along with the cluster proximity and the cluster value associated with the sets of account holders.

3. The network of claim 1, wherein each record of a plurality of records represents an account holder of the account holders.

4. The network of claim 1, wherein the cluster value comprises a center value of the sets of the account holders.

5. The network of claim 1, wherein the field of the record of the new account holder comprises a credit limit.

6. The network of claim 1, wherein the new-accountholder-to-cluster-value distance comprises a distance between the cluster value and a value of the field of the record of the new account holder.

7. A network comprising:
a host configured to map a record of a new account holder according to a known nearest neighbor method of the host,
the host configured to direct historically processed data to be stored;
a distributed storage system comprising a plurality of nodes,
the distributed storage system configured to direct the historically processed data to the host, in response to the known nearest neighbor method of the host;
a telecommunications transfer channel logically connecting the host to the distributed storage system;
a historical data retrieval engine configured to load the historically processed data;
a distance evaluator configured to evaluate a distance between a cluster value of each of the sets of the account holders and a corresponding value of a field of a record of the new account holder to determine a new-account holder-to-cluster-value distance;
an outer radius boundary determiner configured to determine an outer radius boundary of each of the sets of the account holders, wherein the outer radius boundary of the sets of the account holders comprises a sum of a cluster proximity and the new-accountholder-to-cluster-value distance;
a first ceiling number radius receiver configured to receive a first ceiling number radius;
a set discarder configured to retain each of the sets of the account holders with a new-account holder-to-clustervalue distance locating a portion of the sets of the account holders within the first ceiling number radius;

a communication bus disposed in logical communication with the historical data retrieval engine, the distance evaluator, the outer radius boundary determiner, the first ceiling number radius receiver, and the set discarder; and a bus controller disposed in logical communication with the communication bus and configured to direct communication among the historical data retrieval engine, the distance evaluator, the outer radius boundary determiner, the first ceiling number radius receiver, and the set discarder.

8. A method comprising:

evaluating, by a host processor, a distance between a cluster value of each sets of account holders and a corresponding value of a field of a record comprising a new account holder;

determining, by the host processor and based on the evaluating, a new-accountholder-to-cluster-value distance;

adding, by the host processor, a cluster proximity of each of the sets of the account holders to the new-accountholder-to-cluster-value distance of the sets of the account holders to form an outer radius boundary of the sets of the account holders comprising a distance from the new account holder to a farthest most boundary of each of the sets of account holders, wherein the outer radius boundary of the sets of the account holders comprises a sum of the cluster proximity and the new-accountholder-to-cluster-value distance;

receiving, by the host processor, a first ceiling number radius comprising a distance from the new account holder encircling a first ceiling number of records; and discarding, by the host processor, each of the sets of the account holders with the new-accountholder-to-cluster-value distance that is not located within a portion of the sets of the account holders within the first ceiling number radius.

9. The method of claim 8, further comprising:

determining a value of the field of the record for all records representing the sets of the account holders;

grouping the records into the sets of the account holders located within the cluster proximity of the cluster value, wherein the cluster value comprises a center point of the sets of the account holders and the cluster proximity comprises a radius about the cluster value; and storing in a historically processed data database the sets of the account holders, along with the cluster proximity and the cluster value associated with the sets of account holders.

10. The method of claim 8, wherein each record represents the new account holder.

11. The method of claim 8, wherein the cluster value comprises a center value of the sets of the account holders.

12. The method of claim 8, wherein the field of the record of the new account holder comprises a credit limit.

13. The method of claim 8, wherein the new-accountholder-to-cluster-value distance comprises the distance between the cluster value and a value of the field of the record of the new account holder.

14. The method of claim 8, wherein the outer radius boundary of the sets of the account holders comprises the sum of the cluster proximity and the new-accountholder-to-cluster-value distance.

* * * * *